G. C. BAILEY.

Stop-Cocks.

No. 8,024. Reissued Jan. 8, 1878.

Witnesses
George C. Bailey
Claudius L. Parker

Inventor George C. Bailey,
By Attorney George H. Christy.

UNITED STATES PATENT OFFICE.

GEORGE C. BAILEY, OF PITTSBURG, PENNSYLVANIA.

IMPROVEMENT IN STOP-COCKS.

Specification forming part of Letters Patent No. 127,547, dated June 4, 1872; Reissue No. 8,024, dated January 8, 1878; application filed July 11, 1877.

*To all whom it may concern:*

Be it known that I, GEORGE C. BAILEY, of Pittsburg, in the county of Allegheny and State of Pennsylvania, have invented a new and useful Improvement in Stop-Cocks; and I do hereby declare the following to be a full, clear, and exact description thereof, reference being had to the accompanying drawings, making part of this specification, in which—

Figure 1:
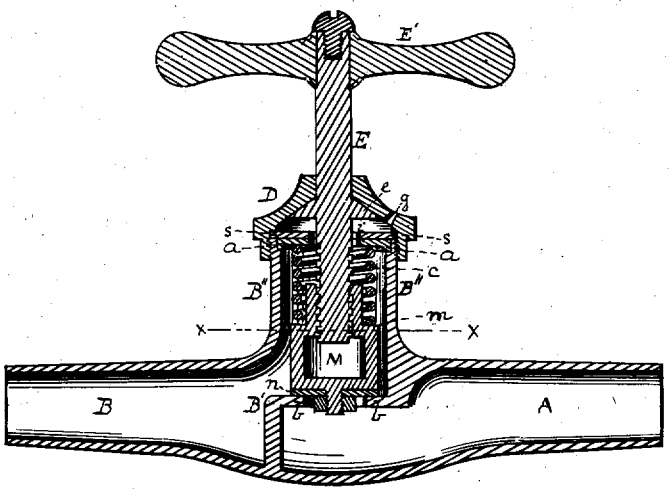
Figure 2:
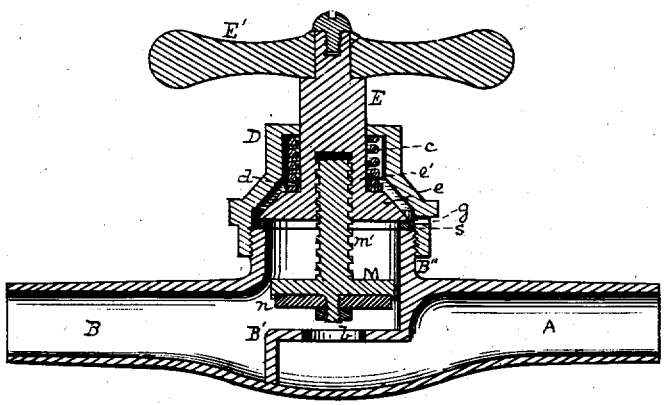
Figure 3:
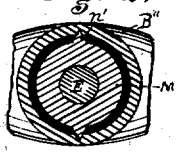

Figure 1 is a vertical sectional view of my improved stop-cock. Fig. 2, by a like view, shows a modified arrangement of the same devices; and Fig. 3 is a cross-section through *x x*, Fig. 1.

Like letters of reference indicate like parts in each.

My invention relates to that class of stop-cocks in which the main valve closes against the pressure, and a water-waste passage is desired for the purpose of emptying the discharge-pipe. In most or all such stop-cocks, as heretofore made, the main supply and water-waste have been opened and closed by separate and independently-acting devices; or, where a single device was employed for both purposes, the water-supply was commonly opened before the water-waste passage was closed, with a consequent unnecessary waste of water.

By my improvement I combine a spring with the valve-stem and valves, in such a way that its action shall prevent the opening of either the water-supply or the water-waste until the other is closed.

To enable others skilled in the art to make and use my invention, I will proceed to describe its construction and mode of operation.

In the drawings, A represents the supply-pipe, and B the discharge. A diaphragm, B′, separates the two, and in this is a water-supply opening, around which is the valve-seat *b*. B″ is the valve-case, closed at its upper end by the screw-cap D, and through this plays the valve-stem E, which is operated by a T, E′, or equivalent device. This stem is threaded at its lower end, and carries a valve, M, on the upper open end of which is a tapped socket for the threaded stem E to work in. This valve has a suitable packing, *n*, on its lower face, and has only a vertical motion, being prevented from rotating by the ribs *n′*, which play in grooves in the side of the valve-case, as shown in Fig. 3. I am now describing more particularly the devices shown in Fig. 1. Just inside the upper end of the valve-case B″, and on a shoulder therein, I place an annular metallic washer, *a*. Resting on this, and projecting out so as to cover the end of the valve-case B″, is a packing-ring, *s*, the two being pressed well down, and held tightly in place by the screw-cap D. The opening through the washer *a* and packing-ring *s* is a little larger than the stem E, as at *i*, so as to provide room for the waste water to pass up through and out at the water-escape opening *g*. On the stem E is a flange, *e*, of such diameter that when down it will close the annular opening *i*, but when up will leave that opening and the water-waste opening unobstructed. But the form of the opening *i* is unimportant.

A spiral spring, *c*, is arranged with one end bearing on a shoulder, *m*, of the valve M, and the other end against the lower face of the washer *a*, though it may bear against any other fixed device appertaining to the valve-case. These devices being in the position shown in Fig. 1, it will be obvious that on the stem E being turned down the spring *c* will hold the valve M to its seat until the flange *e* rests on the packing-ring *s*. This will close the annular opening *i*, and cut off communication with the water-waste passage *g*. Then, as the turning of the stem is continued, the valve M will be raised from its seat, and the water-supply be opened. When the stem is turned the other way, the action of the spring *c* on the valve M will cause the latter to be seated, so cutting off the water-supply; and then the flange *e* will rise from its seat and open communication with the water-waste; and in this operation the flange *e* performs the function of a valve.

In Fig. 2 I have shown substantially the same devices with a like operation, but in an arrangement somewhat modified. The same letters of reference indicate the same parts as in Fig. 1. The washer *a* and flange *e* of Fig. 1 are, in this arrangement, combined together in the flange *e*. The upper end of the valve M is of stem form, as at *m′*, and this stem screws into and out of the tapped socket *e′*. This flange *e* is large enough to cover the entire opening of the valve-case, and the spring *c* is arranged above the flange, with one end bearing thereon, and the other bearing against the cap, or other fixed part of the valve-case B″, with or without an interposed bearing-ring, *d*.

With the devices in the position shown in Fig. 2 the water-supply is open, and the flange *e*, being pressed down on the packing-ring *s*, closes communication with the waste-passage *g*. If, now, the valve M be screwed down to its seat, the flange *e* will retain its place till the valve strikes its seat, and then, the turning of the stem being continued, the spring *c* will be compressed, and the flange *e* rise from its seat, thus opening communication from the discharge-pipe to the waste-passage. In closing the water-waste and opening the valve the operation is directly the reverse, the flange first closing down on its seat, and then the valve being opened.

It will be observed that the operation in Figs. 1 and 2 is the same; that in both the water-supply and water-waste are each opened and closed immediately on the closing or opening of the other; that in no case can both be open at the same time; that both are operated by a single device; and that the device by which the same operation is secured in both is the spring *c*, with one end bearing on a fixed seat, and the other end bearing on either the valve which closes the water-supply or on the flange which closes the waste, with or without an interposed ring, *d*.

I claim herein as my invention—

1. In a stop-cock, the main valve of which closes against the pressure, the combination of rotating valve-stem and vertical spring, with the supply and waste ports, and valves governing the same, substantially as set forth, whereby the elastic force of the spring shall be operative in holding one valve to its seat, while the stem is being rotated to shift the other valve.

2. A vertical spring, combined in a stop-cock valve-case, with a threaded rotating stem, a main valve closing against the pressure, and a waste-port valve, and arranged to press the waste-port valve against its port, and thereby close the waste, while the through water-way port is open, substantially as set forth.

3. The combination of a flange, *e*, packing-ring *s*, spring *c*, and waste-passage *g*, arranged substantially as and for the purposes set forth.

4. In a stop-cock, the combination of the flanged stem E, packing-ring *s*, waste-passage *g*, and spring *c*, with valve M, and seat *b*, arranged substantially as and for the purposes set forth.

In testimony whereof I have hereunto set my hand.

GEORGE C. BAILEY.

Witnesses:
J. J. McCormick,
Claudius L. Parker.